US012292361B2

(12) United States Patent
Jiang et al.

(10) Patent No.: US 12,292,361 B2
(45) Date of Patent: May 6, 2025

(54) LAYERED INTERCEPTION CONTAMINATED SOIL SAMPLING APPARATUS

(71) Applicant: Nanjing Institute of Environmental Sciences, Ministry of Ecology and Environment, Nanjing (CN)

(72) Inventors: Jinlin Jiang, Nanjing (CN); Yufeng Xie, Nanjing (CN); Shang Gao, Nanjing (CN); Yang Guo, Nanjing (CN); Jiaqi Shi, Nanjing (CN); Tao Long, Nanjing (CN); Renbing Liu, Nanjing (CN)

(73) Assignee: NANJING INSTITUTE OF ENVIRONMENTAL SCIENCES, MINISTRY OF ECOLOGY AND ENVIRONMENT, Nanjing (CN)

( * ) Notice: Subject to any disclaimer, the term of this patent is extended or adjusted under 35 U.S.C. 154(b) by 0 days.

(21) Appl. No.: 18/740,969

(22) Filed: Jun. 12, 2024

(65) Prior Publication Data

US 2024/0426712 A1 Dec. 26, 2024

(30) Foreign Application Priority Data

Jun. 21, 2023 (CN) ......................... 202310742082.6

(51) Int. Cl.
*G01N 1/08* (2006.01)

(52) U.S. Cl.
CPC ..................................... *G01N 1/08* (2013.01)

(58) Field of Classification Search
CPC ........... G01N 1/08; E21B 7/064; E21B 27/00; E21B 10/48; E21B 10/06; E21B 10/02; E21B 10/40; E21B 10/445; E21B 10/46
See application file for complete search history.

(56) References Cited

FOREIGN PATENT DOCUMENTS

| | | | | |
|---|---|---|---|---|
| CN | 216116857 | U | | 3/2022 |
| CN | 114459796 | A | | 5/2022 |
| CN | 216916836 | U | | 7/2022 |
| CN | 115112414 | A | | 9/2022 |
| CN | 217778565 | U | | 11/2022 |
| CN | 218330701 | U | * | 1/2023 |
| CN | 218629048 | U | | 3/2023 |
| JP | 2022139405 | A | | 9/2022 |

* cited by examiner

*Primary Examiner* — John Fitzgerald
*Assistant Examiner* — Truong D Phan
(74) *Attorney, Agent, or Firm* — Muncy, Geissler, Olds & Lowe, P.C.

(57) ABSTRACT

A layered interception contaminated soil sampling apparatus, including a fixed bracket and a lifting platform, the lifting platform being arranged on the top of the fixed bracket and fixedly connected to the fixed bracket; the layered interception contaminated soil sampling apparatus further including: a sample taking apparatus, arranged below the lifting platform, the top of the sample taking apparatus being fixedly connected to a movable end of the lifting platform, the sample taking apparatus being used to take a soil sample; a storage apparatus, arranged inside the fixed bracket, the storage apparatus being fixedly connected to the inside of the fixed bracket and used to store a sample taking device and samples taken; and a fixed base, arranged at the bottom of the fixed bracket and fixedly connected to the fixed bracket.

3 Claims, 9 Drawing Sheets

LAYERED INTERCEPTION CONTAMINATED SOIL SAMPLING APPARATUS

TECHNICAL FIELD

The present invention relates to the technical field of soil sampling, and specifically a layered interception contaminated soil sampling apparatus.

BACKGROUND

Soil sampling refers to methods of collecting soil samples, including sampling layout and sample taking techniques. Collecting profile soil samples should be carried out after the end of profile observation and recording. Before sampling, the profile should be trimmed and cleaned first, and the top layer of floating soil should be removed. Then, samples should be taken from the typical central part layer by layer from top to bottom. When sampling in the field, due to the heterogeneity of spatial distribution of the soil itself, a plurality of points should be sampled based on the plot and then mixed into a mixed sample, so as to better represent soil properties of a sample taking area. Sampling methods generally include the following: a diagonal sampling method, which is suitable for sewage irrigation plots by sampling at various equally divided center points of a diagonal line; a plum blossom sampling method, which is suitable for plots with small areas, flat terrains and uniform soil; a checkerboard sampling method, which is suitable for plots with medium areas, flat terrains, basically complete terrains, and uneven soil; and a serpentine sampling method, which is suitable for plots with small areas, uneven terrains, uneven soil and more sampling points required.

For a sample taking apparatus currently used, a sample taking tube is usually integrated with a drill bit, causing that the drill bit needs to be replaced together with the sample taking tube when being damaged, with a relatively high cost and inconvenience to separately take samples of soil layers at different depths.

SUMMARY

In order to achieve the above objective, the present invention is achieved through the following technical solution: a layered interception contaminated soil sampling apparatus, including a fixed bracket and a lifting platform, where the lifting platform is arranged on the top of the fixed bracket and fixedly connected to the fixed bracket; the layered interception contaminated soil sampling apparatus further includes:

- a sample taking apparatus, arranged below the lifting platform, the top of the sample taking apparatus being fixedly connected to a movable end of the lifting platform, the sample taking apparatus being used to take a soil sample;
- a storage apparatus, arranged inside the fixed bracket, the storage apparatus being fixedly connected to the inside of the fixed bracket and used to store a sample taking device and samples taken; and
- a fixed base, arranged at the bottom of the fixed bracket and fixedly connected to the fixed bracket, the fixed base being used to place the fixed bracket on the ground. The soil samples taken can be stored in the storage apparatus after the sample taking is completed to facilitate the sample taking apparatus to implement continuous sample taking operations.

Preferably, the sample taking apparatus includes a sample taking tube, where connecting struts are fixedly connected to both sides of the top of the sample taking tube, a rotating block is fixedly connected to the ends of the connecting struts that are away from the sample taking tube, a drive shaft of a drive motor is fixedly connected to the center of the side of the rotating block that is away from the connecting struts, a telescopic push rod is fixedly connected to the bottom center of the rotating block, a mounting base is fixedly connected to the bottom of the telescopic push rod, and a drill bit is fixedly connected to the bottom of the mounting base through a fixing buckle. The wear on the sample taking tube can be conveniently reduced, and the separate arrangement of the drill bit and the sample taking tube facilitates the reduction of maintenance costs.

Preferably, the drive motor is fixedly connected to the movable end of the lifting platform through a connecting bracket, and the rotating block is rotationally connected to the movable end of the lifting platform through a rotating bracket.

Preferably, the storage apparatus includes an annular storage box, where storage tanks are defined on the side of the annular storage box, layered sample taking tubes are slidingly connected to the inner walls of the storage tanks, buckle grooves are defined at the tops of the layered sample taking tubes, elastic telescopic rods are fixedly connected to one sides of the inner walls of the storage tanks, push blocks are fixedly connected to moveable ends of the elastic telescopic rods, an annular baffle is rotationally connected to the inner sidewall of the annular storage box through a bearing ring, and the annular baffle is defined with a pick-and-place opening that matches with the storage tanks, which is convenient to separately store the samples taken out at each depth, and at the same time, the storage effect is also relatively stable since the samples can be fixed by extrusion of the annular baffle and the push blocks during storage.

Preferably, the outer side of the annular storage box is fixedly connected to the inner wall of the fixed bracket through a connecting rod, and a plurality of sets of the storage tanks are provided.

Preferably, the fixed base includes a fixed ring, where lifting rods penetrate through and are fixedly connected to the fixed ring, an insert rod is fixedly connected to the bottom of each lifting rod, small push rods are rotationally connected to both sides of each insert rod, inverted hook rods are rotationally connected to both sides of the bottom of each insert rod, and a triangular insert block is fixedly connected to the bottom of each insert rod to facilitate increasing the resistance of the insert rods and the inverted hook rods to rise, that is, the fixed ring and the fixed bracket on the fixed ring can be fixed, which has better fixing effect and uneasy falling off.

Preferably, the top of the fixed ring is fixedly connected to the bottom of the fixed bracket, a plurality of sets of the lifting rods are provided and evenly distributed at the bottom of the fixed ring, and the ends of the small push rods that are away from the insert rods are rotationally connected to the sides of the inverted hook rods.

The present invention provides a layered interception contaminated soil sampling apparatus, which has the following beneficial effects:

1. When using this layered interception contaminated soil sampling apparatus, the sample taking apparatus is driven to descend through the lifting platform, and the sample taking apparatus is inserted into the soil that needs sample taking for sample taking. The soil samples taken can be stored in the storage apparatus after the sample taking is completed to facilitate the sample taking apparatus to implement continuous sample taking operations.

2. This layered interception contaminated soil sampling apparatus is provided with a sample taking apparatus. When in use, the lifting platform drives the drive motor and the rotating block to descend through the connecting bracket and the rotating bracket, the rotating block drives the sample taking tube to descend through the connecting struts, the telescopic push rod extends and transfers the drill bit to move to the bottom of the sample taking tube, and the soil is drilled through the drill bit. When the depth reaches the appropriate position, the drill bit is then pulled out from the inside of the sample taking tube, and a sample is taken through the sample taking tube. The wear on the sample taking tube can be conveniently reduced, and the separate arrangement of the drill bit and the sample taking tube facilitates the reduction of maintenance costs.

3. This layered interception contaminated soil sampling apparatus is provided with a storage apparatus. When layered sample taking is required, the drill bit is removed from the mounting base, and then the layered sample taking tubes are mounted on the mounting base. The layered sample taking tubes are pushed to the end of the sample taking tube through the elastic telescopic rods, and thus soil samples can be taken through the layered sample taking tubes. When the sample taking of the layered sample taking tubes is completed, the layered sample taking tubes are pulled out from the inside of the sample taking tube through the telescopic push rods, and are removed from the mounting base and placed inside the annular storage box, which facilitates the separate storage of samples taken out at each depth. At the same time, when picking and placing the layered sample taking tubes, only the annular baffle needs to be rotated, and the annular baffle drives the pick-and-place opening to rotate. When the pick-and-place opening rotates to the positions facing the layered sample taking tubes, the elastic telescopic rods can push the layered sample taking tubes out of the pick-and-place opening through the push blocks. The picking operation is convenient, and the storage effect is also relatively stable since the samples can be fixed by extrusion of the annular baffle and the push blocks during storage.

4. This layered interception polluted soil sampling apparatus is provided with a fixed base. During fixation, the insert rods are inserted into the ground soil through the triangular insert blocks, and then the small push rods extend to push the inverted hook rods to rotate and unfold, so that the inverted hook rods and the insert rods are separated, and an angle is formed between the inverted hook rods and the insert rods, thereby increasing the resistance of the insert rods and the inverted hook rods to rise, that is, the fixed ring and the fixed bracket on the fixed ring can be fixed, which has better fixing effect and uneasy falling off.

Figure 1:
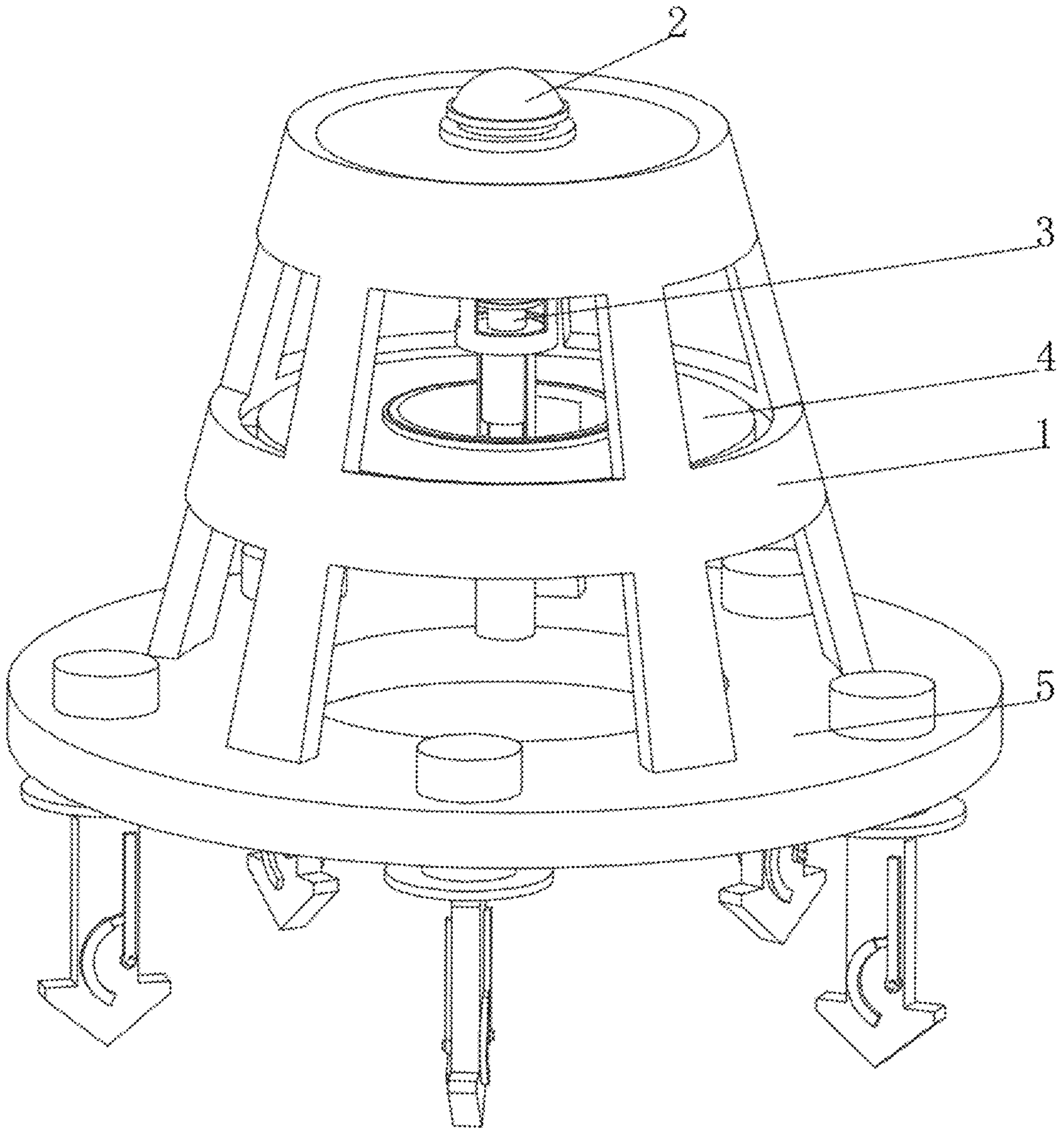
FIG. 1 is a schematic structural diagram of a layered interception contaminated soil sampling apparatus of the present invention.

In the drawings: 1, fixed bracket; 2, lifting platform; 3, sample taking apparatus; 31, sample taking tube; 32, connecting strut; 33, rotating block; 34, drive motor; 35, telescopic push rod; 36, mounting base; 37, drill bit; 38, fixing buckle: 39, rotating bracket: 4, storage apparatus; 41, annular storage box; 42, storage tank; 43, layered sample taking tube; 44, buckle groove; 45, elastic telescopic rod; 46, push block; 47, annular baffle; 48, pick-and-place opening; 49, bearing ring; 40, connecting rod: 5, fixed base; 51, fixed ring; 52, lifting rod; 53, insert rod; 54, small push rod; 55, inverted hook rod; and 56, triangular insert block.

DETAILED DESCRIPTION OF EMBODIMENTS

The technical solutions in the embodiments of the present invention will be clearly and completely described below in conjunction with the accompanying drawings in the embodiments of the present invention. Obviously, the described embodiments are only some, not all, of the embodiments of the present invention. Based on the embodiments of the present invention, all other embodiments obtained by those of ordinary skill in the art without creative efforts fall within the scope of protection of the present invention.

Figure 2:
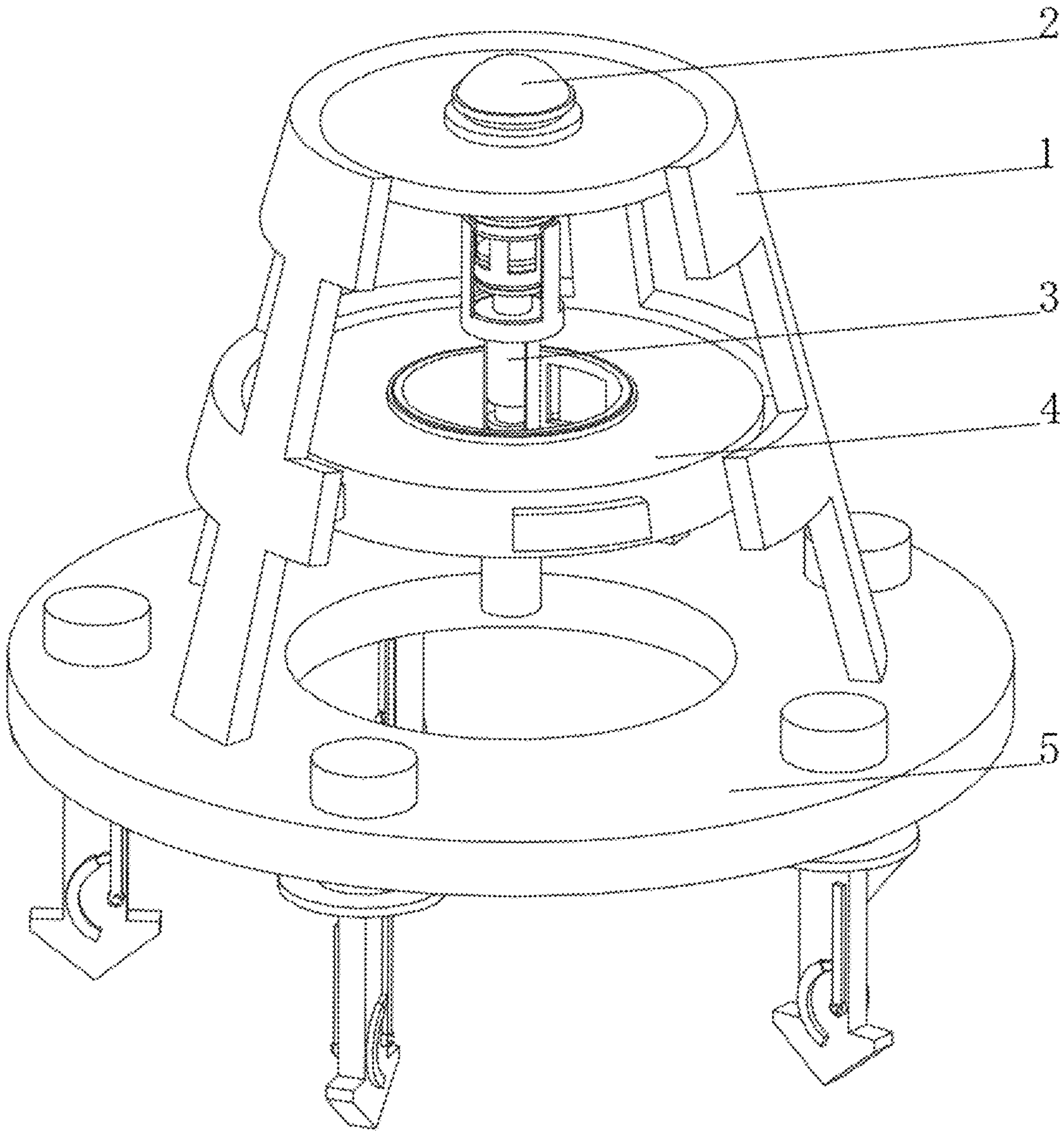
FIG. 2 is a schematic diagram of an internal structure of a layered interception contaminated soil sampling apparatus of the present invention.
Figure 3:
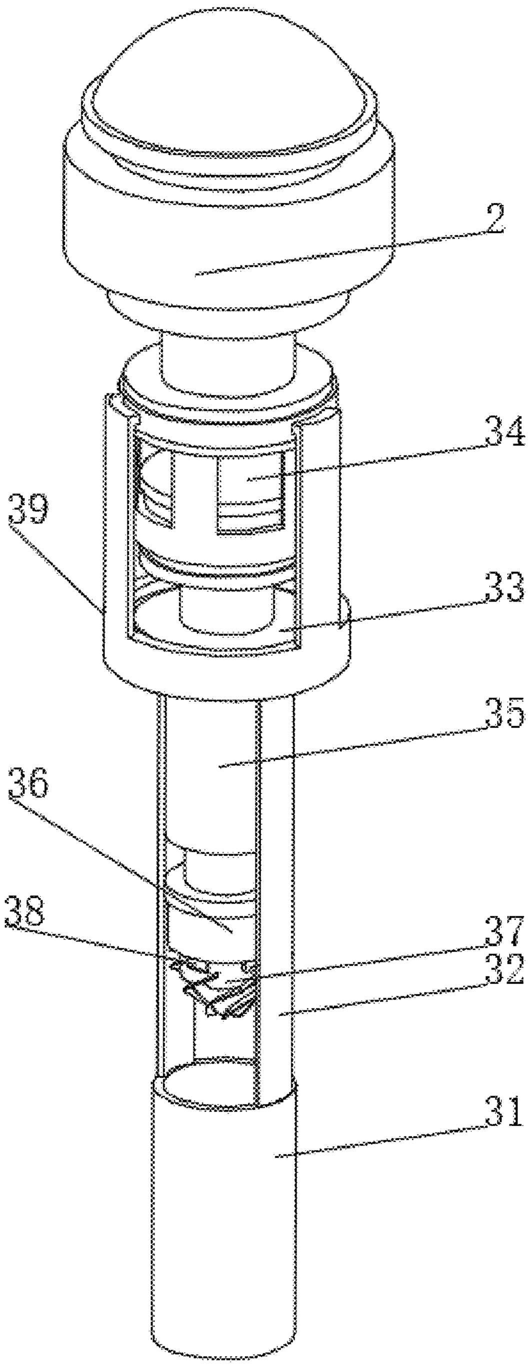
FIG. 3 is a schematic structural diagram of a sample taking apparatus of the present invention.
Figure 4:
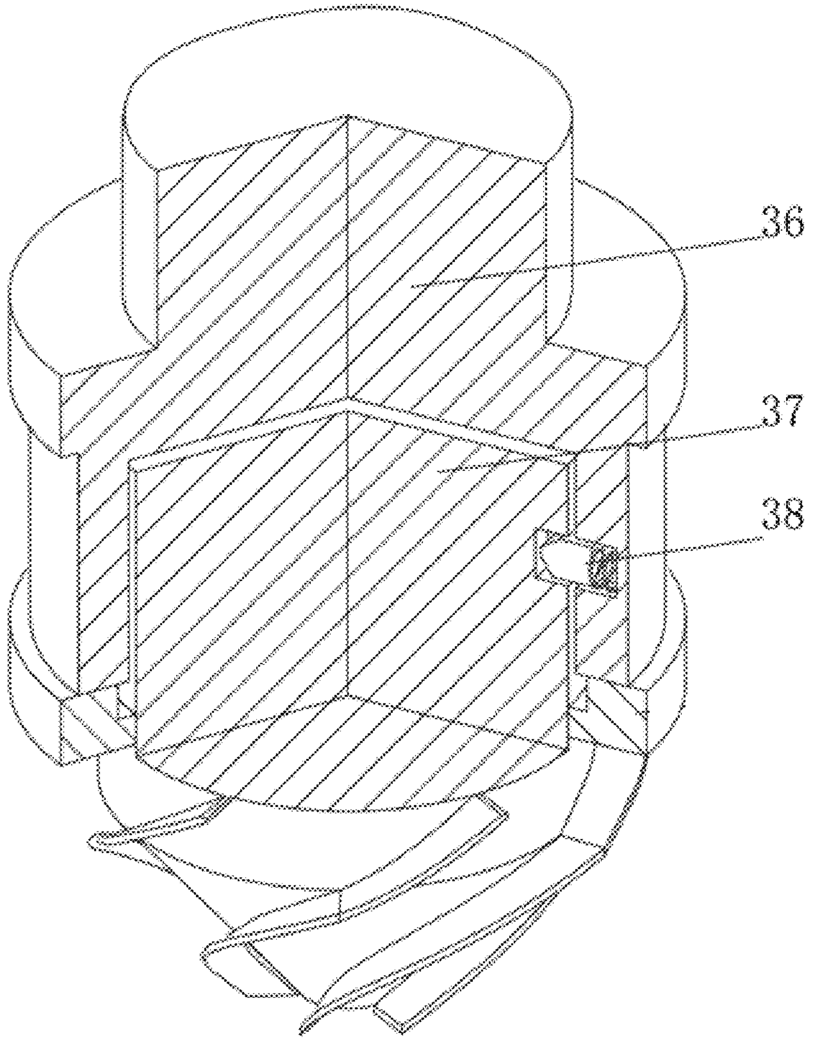
FIG. 4 is a cross-sectional view of a part of the sample taking apparatus of the present invention.
Figure 5:
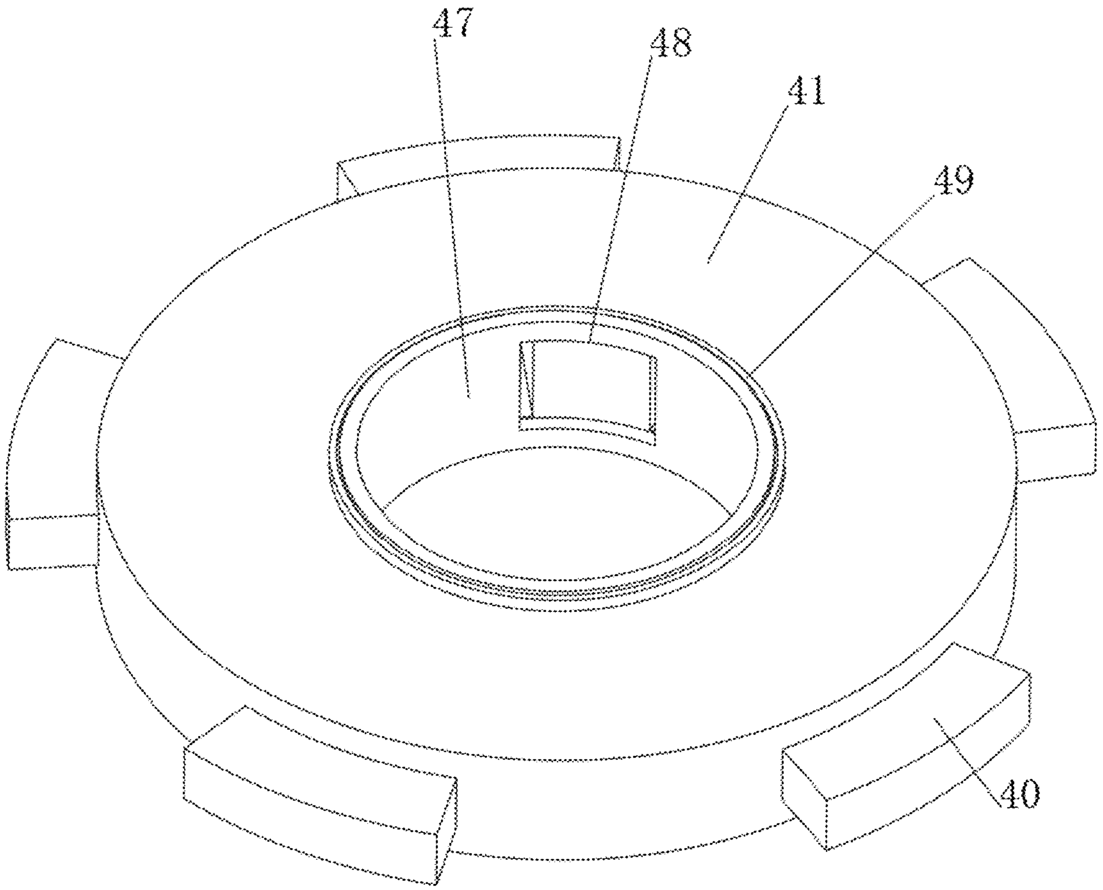
FIG. 5 is a schematic structural diagram of a storage apparatus of the present invention.
Figure 6:
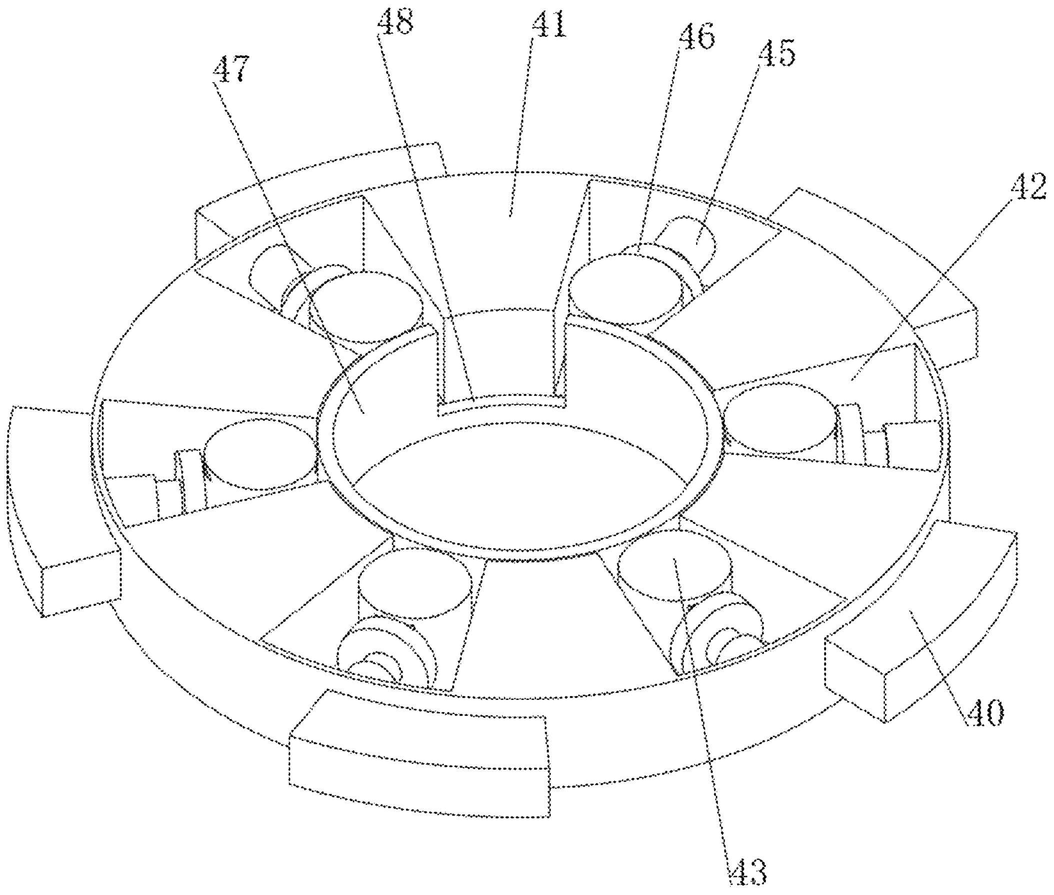
FIG. 6 is a schematic diagram of an internal structure of a storage apparatus of the present invention.
Figure 7:
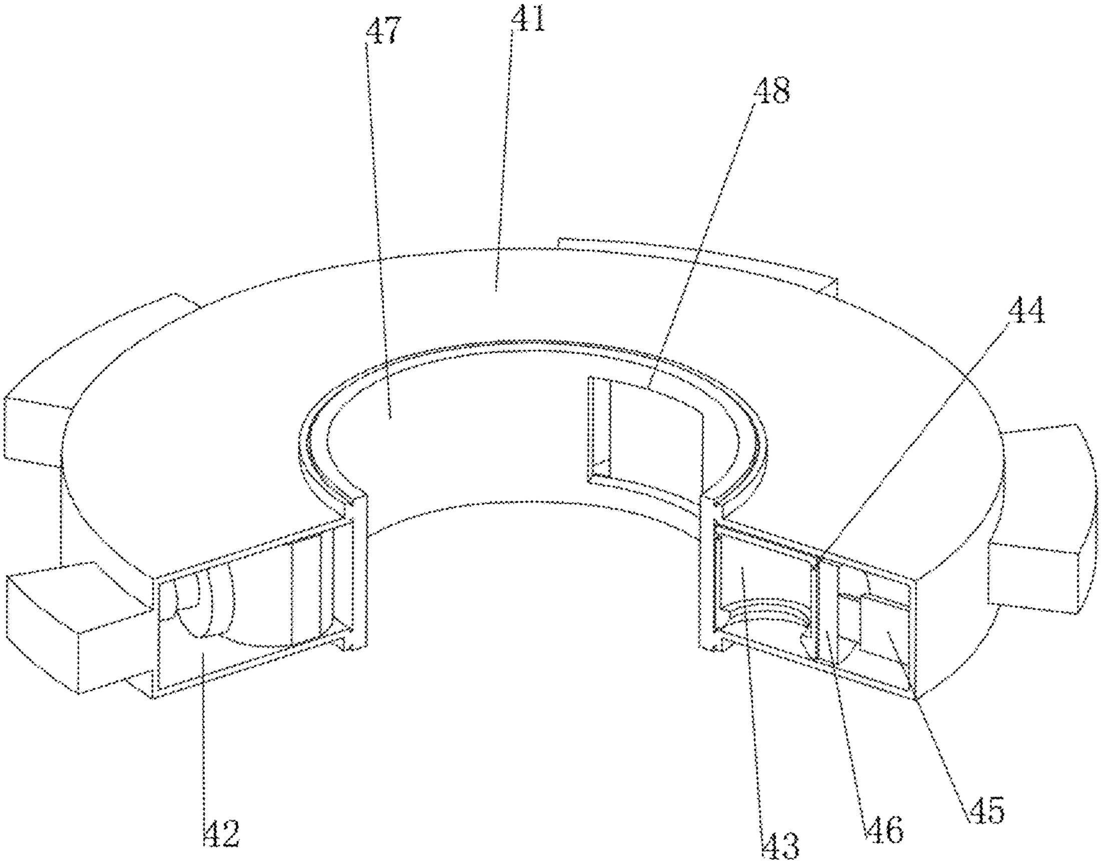
FIG. 7 is a schematic cross-sectional structural diagram of a storage apparatus of the present invention.
Figure 8:
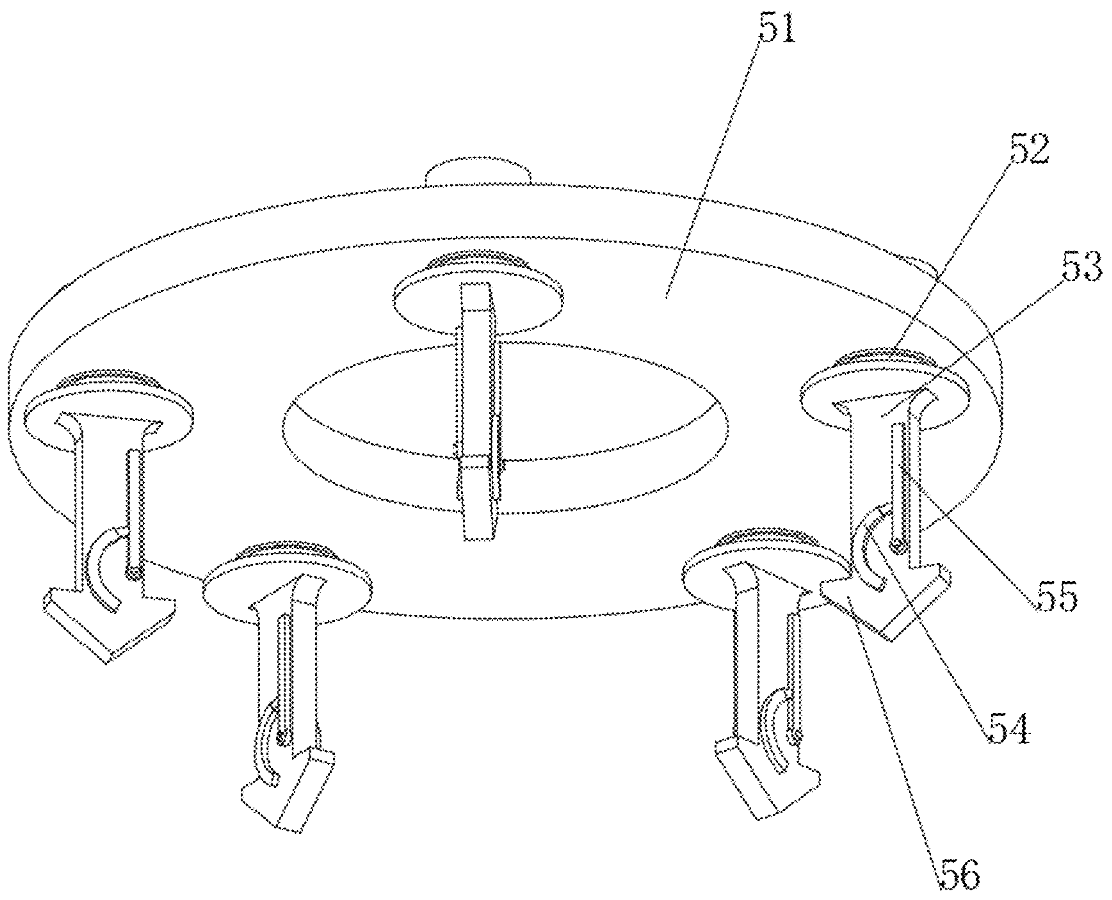
FIG. 8 is a schematic structural diagram of a fixed base of the present invention.
Figure 9:
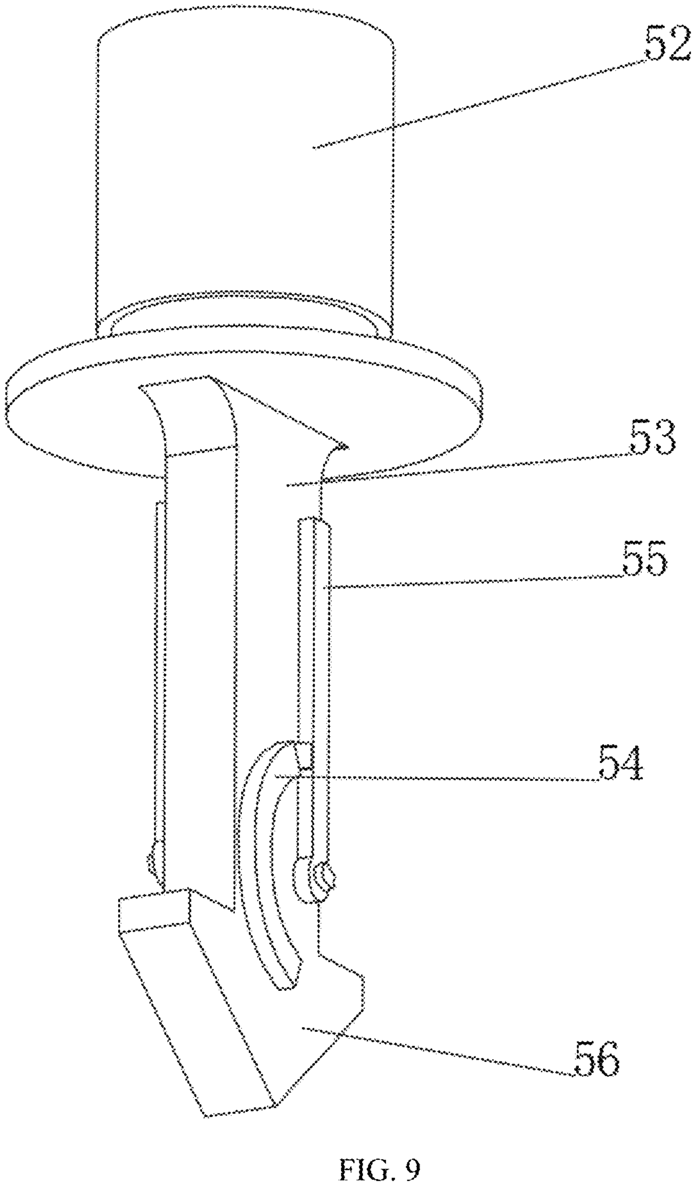
FIG. 9 is a schematic diagram of a connecting structure of an insert rod of the present invention.

Referring to FIGS. 1-2, the present invention provides a technical solution as follows: a layered interception contaminated soil sampling apparatus, including a fixed bracket 1 and a lifting platform 2, where the lifting platform 2 is arranged on the top of the fixed bracket 1 and fixedly connected to the fixed bracket 1; and the layered interception contaminated soil sampling apparatus further includes:

- a sample taking apparatus 3, arranged below the lifting platform 2, the top of the sample taking apparatus 3 being fixedly connected to a movable end of the lifting platform 2, the sample taking apparatus 3 being used to take a soil sample;
- a storage apparatus 4, arranged inside the fixed bracket 1, the storage apparatus 4 being fixedly connected to the inside of the fixed bracket 1 and used to store a sample taking device and samples taken; and
- a fixed base 5, arranged at the bottom of the fixed bracket 1 and fixedly connected to the fixed bracket 1, the fixed base 5 being used to fix the fixed bracket 1 on the ground.

When in use, the sample taking apparatus 3 is driven to descend through the lifting platform 2, and the sample taking apparatus 3 is inserted into the soil that needs sample taking for sample taking. The soil samples taken can be stored in the storage apparatus 4 after the sample taking is completed to facilitate the sample taking apparatus 3 to implement continuous sample taking operations.

Referring to FIGS. 1-4, the present invention provides a technical solution as follows: the sample taking apparatus 3 includes a sample taking tube 31, where connecting struts 32 are fixedly connected to both sides of the top of the sample taking tube 31, a rotating block 33 is fixedly connected to the ends of the connecting struts 32 that are away from the sample taking tube 31, a drive shaft of a drive motor 34 is fixedly connected to the center of the side of the rotating block 33 that is away from the connecting struts 32, a telescopic push rod 35 is fixedly connected to the bottom center of the rotating block 33, a mounting base 36 is fixedly connected to the bottom of the telescopic push rod 35, a drill bit 37 is fixedly connected to the bottom of the mounting base 36 through a fixing buckle 38, the drive motor 34 is fixedly connected to the movable end of the lifting platform 2 through a connecting bracket, the rotating block 33 is rotationally connected to the movable end of the lifting platform 2 through a rotating bracket 39, and tooth spaces are defined at the bottom of the sample taking tube 31. By providing the sample taking apparatus 3, when in use, the lifting platform 2 drives the drive motor 34 and the rotating block 33 to descend through the connecting bracket and the rotating bracket 39, the rotating block 33 drives the sample taking tube 31 to descend through the connecting struts 32, the telescopic push rod 35 extends and transfers the drill bit 37 to move to the bottom of the sample taking tube 31, and the soil is drilled through the drill bit 37. When the depth reaches the appropriate position, the drill bit 37 is then pulled out from the inside of the sample taking tube 31, and a sample is taken through the sample taking tube 31. The wear on the sample taking tube can be conveniently reduced, and the separate arrangement of the drill bit and the sample taking tube 31 facilitates the reduction of maintenance costs.

Referring to FIGS. 1-7, the present invention provides a technical solution as follows: the storage apparatus 4 includes an annular storage box 41, where storage tanks 42 are defined on the side of the annular storage box 41, layered sample taking tubes 43 are slidingly connected to the inner walls of the storage tanks 42, buckle grooves 44 are defined at the tops of the layered sample taking tubes 43, elastic telescopic rods 45 are fixedly connected to one sides of the inner walls of the storage tanks 42, push blocks 46 are fixedly connected to moveable ends of the elastic telescopic rods 45, an annular baffle 47 is rotationally connected to the inner sidewall of the annular storage box 41 through a bearing ring 49, the annular baffle 47 is defined with a pick-and-place opening 48 that matches with the storage tanks 42, the outer side of the annular storage box 41 is fixedly connected to the inner wall of the fixed bracket 1 through a connecting rod 40, a plurality of sets of the storage tanks 42 are provided, the sides of the push blocks 46 that are away from the elastic telescopic rods 45 are close to the sides of the layered sample taking tubes 43, and the buckle grooves 44 match with the fixing buckle 38 at the bottom of the mounting base 36. By providing the storage apparatus 4, when layered sample taking is required, the drill bit 37 is removed from the mounting base 36, and then the layered sample taking tubes 43 are mounted on the mounting base 36. The layered sample taking tubes 43 are pushed to the end of the sample taking tube 31 through the elastic telescopic rods 35, and thus soil samples can be taken through the layered sample taking tubes 43. When the sample taking of the layered sample taking tubes 43 is completed, the layered sample taking tubes 43 are pulled out from the inside of the sample taking tube 31 through the telescopic push rods 35, and are removed from the mounting base 36 and placed inside the annular storage box 41, which facilitates the separate storage of samples taken out at each depth. At the same time, when picking and placing the layered sample taking tubes 43, only the annular baffle 47 needs to be rotated, and the annular baffle 47 drives the pick-and-place opening 48 to rotate. When the pick-and-place opening 48 rotates to the positions facing the layered sample taking tubes 43, the elastic telescopic rods 45 can push the layered sample taking tubes 43 out of the pick-and-place opening 48 through the push blocks 46. The picking operation is convenient, and the storage effect is also relatively stable since the samples can be fixed by extrusion of the annular baffle 47 and the push blocks 46 during storage.

Referring to FIGS. 1-9, the present invention provides a technical solution as follows: the fixed base 5 includes a fixed ring 51, where lifting rods 52 penetrate through and are fixedly connected to the fixed ring 51, an insert rod 53 is fixedly connected to the bottom of each lifting rod 52, small push rods 54 are rotationally connected to both sides of each insert rod 53, inverted hook rods 55 are rotationally connected to both sides of the bottom of each insert rod 53, a triangular insert block 56 is fixedly connected to the bottom of each insert rod 53, the top of the fixed ring 51 is fixedly connected to the bottom of the fixed bracket 1, a plurality of sets of the lifting rods 52 are provided and evenly distributed at the bottom of the fixed ring 51, and the ends of the small push rods 54 that are away from the insert rods 53 are rotationally connected to the sides of the inverted hook rods 55. By providing the fixed base 5, during fixation, the insert rods 53 are inserted into the ground soil through the triangular insert blocks 56, and then the small push rods 54 extend to push the inverted hook rods 55 to rotate and unfold, so that the inverted hook rods 55 and the insert rods 53 are separated, and an angle is formed between the inverted hook rods 55 and the insert rods 53, thereby increasing the resistance of the insert rods 53 and the inverted hook rods 55 to rise, that is, the fixed ring 51 and the fixed bracket 1 on the fixed ring 51 can be fixed, which has better fixing effect and uneasy falling off.

Obviously, the described embodiments are only some, not all, of the embodiments of the present invention. Based on the embodiments of the present invention, all other embodiments obtained by those of ordinary skill in this field and related fields without creative efforts should fall within the scope of protection of the present invention. The structures, apparatuses and operating methods that are not specifically described and explained in the present invention are all implemented according to conventional means in the art unless otherwise specified or limited.

What is claimed is:

1. A layered interception contaminated soil sampling apparatus, comprising a fixed bracket and a lifting platform, the lifting platform being arranged on the top of the fixed bracket and fixedly connected to the fixed bracket, wherein the layered interception contaminated soil sampling apparatus further comprises:

a sample taking apparatus, arranged below the lifting platform, the top of the sample taking apparatus being fixedly connected to a movable end of the lifting platform, the sample taking apparatus being used to take a soil sample;

a storage apparatus, arranged inside the fixed bracket, the storage apparatus being fixedly connected to the inside of the fixed bracket and used to store a sample taking device and samples taken; and a fixed base, arranged at the bottom of the fixed bracket and fixedly connected to the fixed bracket, the fixed base being used to place the fixed bracket on the ground;

the sample taking apparatus comprises a sample taking tube, wherein connecting struts are fixedly connected to both sides of the top of the sample taking tube, a rotating block is fixedly connected to the ends of the connecting struts that are away from the sample taking tube, a drive shaft of a drive motor is fixedly connected to the center of the side of the rotating block that is away from the connecting struts, a telescopic push rod is fixedly connected to the bottom center of the rotating block, a mounting base is fixedly connected to the bottom of the telescopic push rod, and a drill bit is fixedly connected to the bottom of the mounting base through a fixing buckle;

the storage apparatus comprises an annular storage box, wherein storage tanks are defined on the side of the annular storage box, layered sample taking tubes are slidingly connected to the inner walls of the storage tanks, buckle grooves are defined at the tops of the layered sample taking tubes, elastic telescopic rods are fixedly connected to one sides of the inner walls of the storage tanks, push blocks are fixedly connected to moveable ends of the elastic telescopic rods, an annular baffle is rotationally connected to the inner sidewall of the annular storage box through a bearing ring, and the annular baffle is defined with a pick-and-place opening that matches with the storage tanks;

the fixed base comprises a fixed ring, wherein lifting rods penetrate through and are fixedly connected to the fixed ring, an insert rod is fixedly connected to the bottom of each lifting rod, small push rods are rotationally connected to both sides of each insert rod, inverted hook rods are rotationally connected to both sides of the bottom of each insert rod, and a triangular insert block is fixedly connected to the bottom of each insert rod; and the top of the fixed ring is fixedly connected to the bottom of the fixed bracket, a plurality of sets of the lifting rods are provided and evenly distributed at the bottom of the fixed ring, and the ends of the small push rods that are away from the insert rods are rotationally connected to the sides of the inverted hook rods.

2. The layered interception contaminated soil sampling apparatus according to claim 1, wherein the drive motor is fixedly connected to the movable end of the lifting platform through a connecting bracket, and the rotating block is rotationally connected to the movable end of the lifting platform through a rotating bracket.

3. The layered interception contaminated soil sampling apparatus according to claim 1, wherein the outer side of the annular storage box is fixedly connected to the inner wall of the fixed bracket through a connecting rod, and a plurality of sets of the storage tanks are provided.

* * * * *